United States Patent
Leydier et al.

(10) Patent No.: US 8,412,873 B2
(45) Date of Patent: Apr. 2, 2013

(54) USB BRIDGE

(75) Inventors: Robert Leydier, Meudon Cedex (FR); Alain Pomet, Meudon Cedex (FR); Benjamin Duval, Meudon Cedex (FR)

(73) Assignees: Gemalto SA, Meudon Cedex (FR); Invia SAS, Meyreuil (FR)

( * ) Notice: Subject to any disclaimer, the term of this patent is extended or adjusted under 35 U.S.C. 154(b) by 312 days.

(21) Appl. No.: 12/809,898

(22) PCT Filed: Dec. 21, 2007

(86) PCT No.: PCT/IB2007/004445
§ 371 (c)(1),
(2), (4) Date: Jun. 21, 2010

(87) PCT Pub. No.: WO2009/081232
PCT Pub. Date: Jul. 2, 2009

(65) Prior Publication Data
US 2010/0281197 A1  Nov. 4, 2010

(51) Int. Cl.
*G06F 13/36* (2006.01)
*G06F 13/20* (2006.01)

(52) U.S. Cl. ......... 710/306; 710/313; 710/314; 710/315

(58) Field of Classification Search .......... 710/301–302, 710/106, 107, 305–306, 310, 311, 313–315
See application file for complete search history.

(56) References Cited

U.S. PATENT DOCUMENTS

| | | | |
|---|---|---|---|
| 5,923,187 A | 7/1999 | Maugars | |
| 2002/0010821 A1 | 1/2002 | Yu et al. | |
| 2004/0133722 A1* | 7/2004 | Croyle et al. | 710/105 |
| 2006/0036780 A1* | 2/2006 | Dernis et al. | 710/36 |
| 2006/0067140 A1* | 3/2006 | Savage | 365/189.11 |
| 2007/0283076 A1 | 12/2007 | Kim et al. | |
| 2008/0007314 A1* | 1/2008 | Ricard et al. | 327/333 |
| 2009/0075698 A1* | 3/2009 | Ding et al. | 455/558 |

FOREIGN PATENT DOCUMENTS

| JP | 10-289043 A | 10/1998 |
|---|---|---|
| JP | 2001-236303 A | 8/2001 |

OTHER PUBLICATIONS

English language translation of JP 2001-236303. Advanced Industrial Property Network. National Center for Industrial Property and Training. Japan Patent Office. pp. 1-16.*
English language summary of JP 10-289043. Derwent Acc. No. 1999-019580. Derwent Week 199902. Copyright 2012 Derwent Information Ltd.*

(Continued)

*Primary Examiner* — Thomas J Cleary
(74) *Attorney, Agent, or Firm* — Osha Liang LLP

(57) ABSTRACT

A bridge circuit 10 is provided between first data port A1, A2 and second data port B1, B2. The bridge circuit comprises a first transceiver stage 40 comprising at least one input buffer 11, 14 and at least one tri-state output buffer 12, 13 linked to the first data port, a second transceiver stage 50 comprising at least one input buffer 21, 24 and at least one tri-state output buffer 12, 13 linked to the second data port, a first detection circuit 31 for detecting the arrival of a packet by the first data port, a second detection circuit 37 for detecting the arrival of a packet by the second data port. A selection circuitry 34, 35 enables the output of tri-state output buffer of the first or of the second transceiver stage depending of the detection made by the first and second detection circuits.

5 Claims, 7 Drawing Sheets

OTHER PUBLICATIONS

Figure 1:
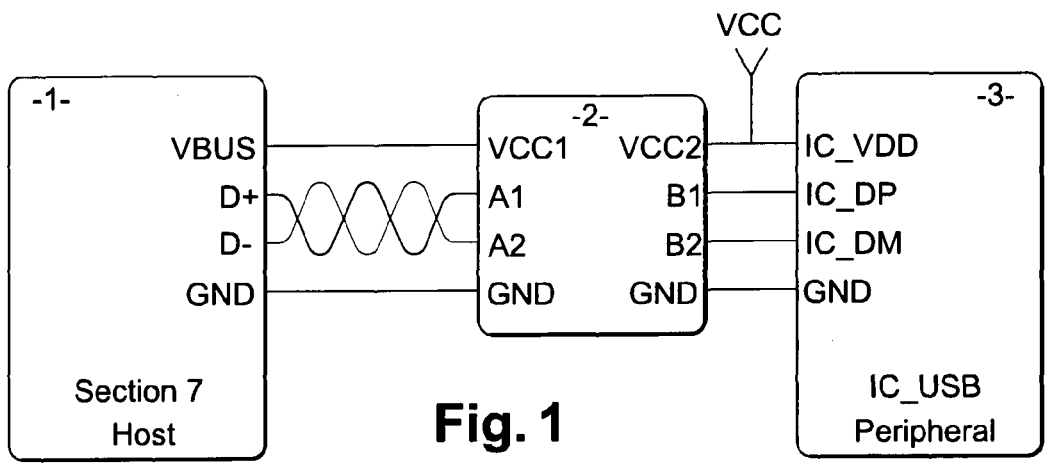

"The Free On-Line Dictionary of Computing". Entry 'Universal Serial Bus'. Online Jan. 31, 2004. Retrieved from Internet Jun. 21, 2012. <http://foldoc.org/Universal+Serial+Bus>.*
Inter-Chip USB Supplement to the USB 2.0 Specification. Revision 1.0. USB Implementers Forum, Inc. Mar. 13, 2006. pp. 1-48.*
"USB On-The-Go Basics". Tutorial 1822. Dec. 20, 2002. Maxim Integrated. Retrieved from Internet Oct. 16, 2012. <http://www.maximintegrated.com/app-notes/index.mvp/id/1822>.*
International Search Report from PCT/IB2007/004445 dated Oct. 31, 2008 (2 pages).
Written Opinion from PCT/IB2007/004445 dated Oct. 31, 2008 (6 pages).
English translation of Official Action from Japanese Patent Office for JP Patent Application No. 2010-538930, Mailed Feb. 14, 2012, 3 pages.

* cited by examiner

USB BRIDGE

The invention relates to the Universal Serial Bus (USB) whose specifications are published by the USB Implementers Forum (USB-IF). More particularly, the invention relates to bridges between USB interface.

The USB is widely used in the PC world. Many peripherals have been developed bringing extra functions to the PC host when connected to it. Recently the USB has also been adopted in embedded systems and more specifically in mobile platforms. For those applications a supplement to the USB 2.0 specification called "Inter Chip USB (IC_USB) specification" has been developed and is included as a supplement in the set of specifications published by the USB-IF. This supplement specifies the electrical details of a USB link between Integrated Circuits (ICs) when there is no need for a shielded cable and when those ICs are separated by less than 10 cm. IC_USB specification is used in place of the electrical characteristics specified in the section 7 of the Universal Serial Bus Specification revision 2.0 dated Apr. 27, 2000 here below referenced as section 7 electrical characteristics.

The IC_USB specification published in March 2006 allows integrated circuits to communicate across two wires named IC_DP and IC_DM, beside ground, named GND, and power supply, named IC_VDD, at Low Speed (LS), Full Speed (FS) and other speeds without a PHYsical (PHY) layer nor a shielded cable, and with both reduced signal swing and zero power idle state. For section 7 compatible transceivers, the PHY is activated by logical signals and PHY drives the two data lines, D+ and D−, loaded with a USB cable with appropriate analog signals independent of the power supply voltage $V_{BUS}$.

For IC_USB transceivers, the power supply voltage IC_VDD defines the logical signal swing on IC_DP and IC_DM. The logical-signal swing is related to the power supply voltage IC_VDD that depends of a voltage class of the chip implementing IC_USB. Buffers include logic circuitry with a possible slew rate control on output signals to minimize electromagnetic interferences.

The IC_USB technology helps create new applications for USB in embedded systems. The European Telecommunication Standard Institute [ETSI] has selected this technology in November 2006 as the High Speed Protocol for new Subscriber Identification Module [SIM] peripherals called UICC. The UICC specification was adopted and published by ETSI in May 2007 and the 3GPP standard organization included it in its release 7 early June 2007. UICC is just one example of mass produced products making use of the IC_USB technology.

Currently, USB circuits are in conformity with Universal Serial Bus Specification revision 2.0 section 7 because most of these USB circuits are intended to be used has drivers of common USB port. In addition, some USB devices, like phone handsets as example, may have a need of an external USB port compatible with section 7 of USB 2.0 and of an internal USB port compatible with IC_USB. Other needs may arise for connecting an IC_USB device on an USB port of a PC. The man of the art has not a solution for interconnecting different kind of USB device that are not directly compatible.

The present invention discloses interfaces between an USB Host port compliant with section 7 electrical characteristics or with IC_USB electrical characteristics and an USB Peripheral compliant with IC_USB electrical characteristics or section 7 electrical characteristics respectively. The adaptation may be only between an USB host with IC_USB electrical characteristics having a first voltage class and an USB Peripheral with IC_USB electrical characteristics having a second voltage class.

In particular, the invention relates to a bridge circuit between a first data port and a second data port. Said bridge circuit comprises a first transceiver stage, a second transceiver stage, a first detection circuit, a second detection circuit, and a selection circuitry. The first transceiver stage is supplied within a first voltage range. Said first transceiver stage comprises at least one input buffer having an input linked to the first data port and at least one tri-state output buffer having an output linked to the first data port. The second transceiver stage is supplied within a second voltage range. Said second transceiver stage comprising at least one input buffer having an input linked to the second data port and at least one tri-state output buffer having an output linked to the second data port. The first detection circuit is linked to first transceiver stage for detecting the arrival of a packet by the first data port. The second detection circuit is linked to second transceiver stage for detecting the arrival of a packet by the second data port. The selection circuitry enables the output of tri-state output buffer of the first or of the second transceiver stage depending of the detection made by the first and second detection circuits.

Preferentially, the first detection circuit detects a signal transition on the input buffer of the first transceiver stage. Said transition enables the output of the tri-state output buffer of the second transceiver stage. The second detection circuit detects a signal transition on the input buffer of the second transceiver stage. Said transition enables the output of the tri-state output buffer of the first transceiver stage. At least a third detection circuit may be include for detecting the end of a packet arriving by the first data port or by the second data port.

In a different approach, the invention relates to a method for establishing a communication between a first data port and a second data port, through a bridge circuit that comprises a first transceiver stage and a second transceiver stage. The first transceiver stage is supplied within a first voltage range. Said first transceiver stage comprises at least one input buffer having an input linked to the first data port and at least one tri-state output buffer having an output linked to the first data port. The second transceiver stage is supplied within a second voltage range. Said second transceiver stage comprises at least one input buffer having an input linked to the second data port and at least one tri-state output buffer having an output linked to the second data port. The method more particularly comprises a detection step and an enabling step. The detection step detects the arrival of a packet on the first data port and on the second data port. The enabling step enables the output of the tri-state output buffer of the second or respectively the first transceiver stage and inhibition of the detection on the second data port of respectively on the first data port, if a detection has occurred on the first data port or respectively on the second data port.

In a preferential manner, if a detection of a packet has occurred on the first data port, the data carried from the output of the input buffer are delayed then transmitted to the input of the tri-state output buffer of the second transceiver stage. If a detection of a packet has occurred on the second data port, the data carried from the output of the input buffer are delayed then transmitted to the input of the tri-state output buffer of the first transceiver stage.

Figure 2:
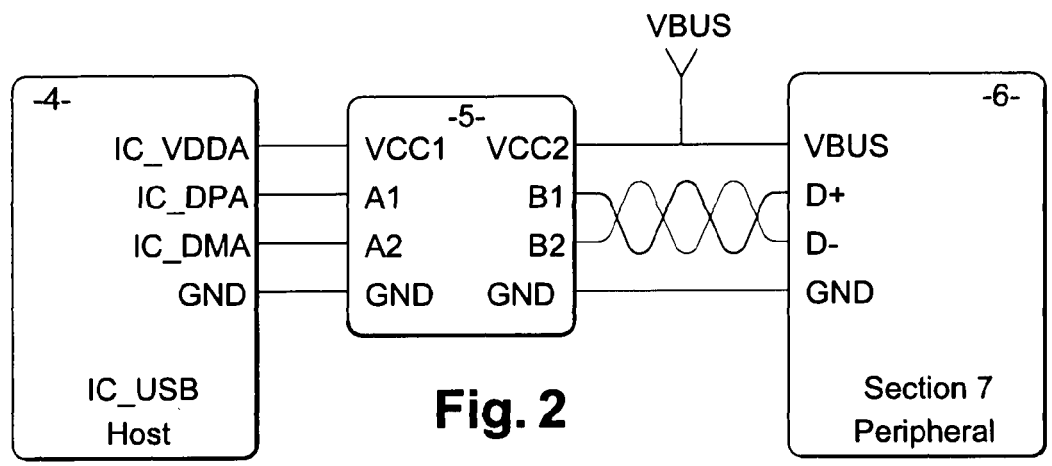
Figure 3:
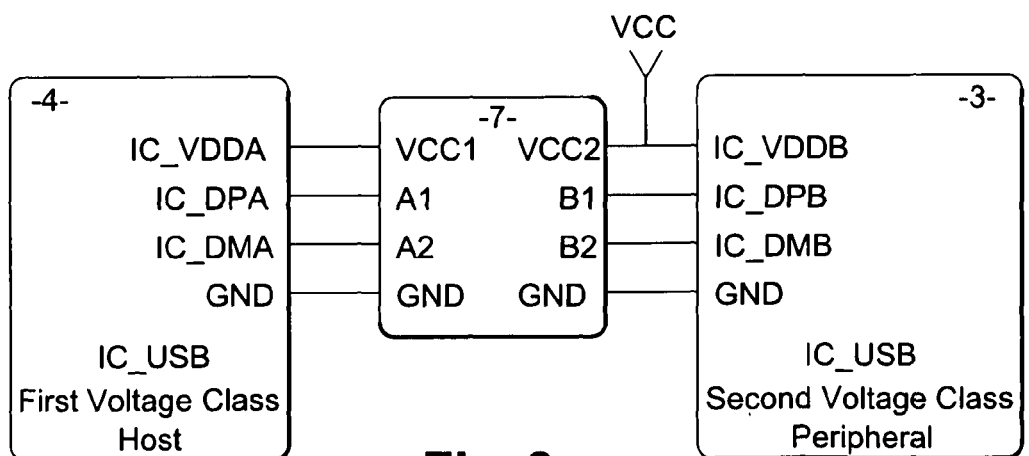
Figure 4:
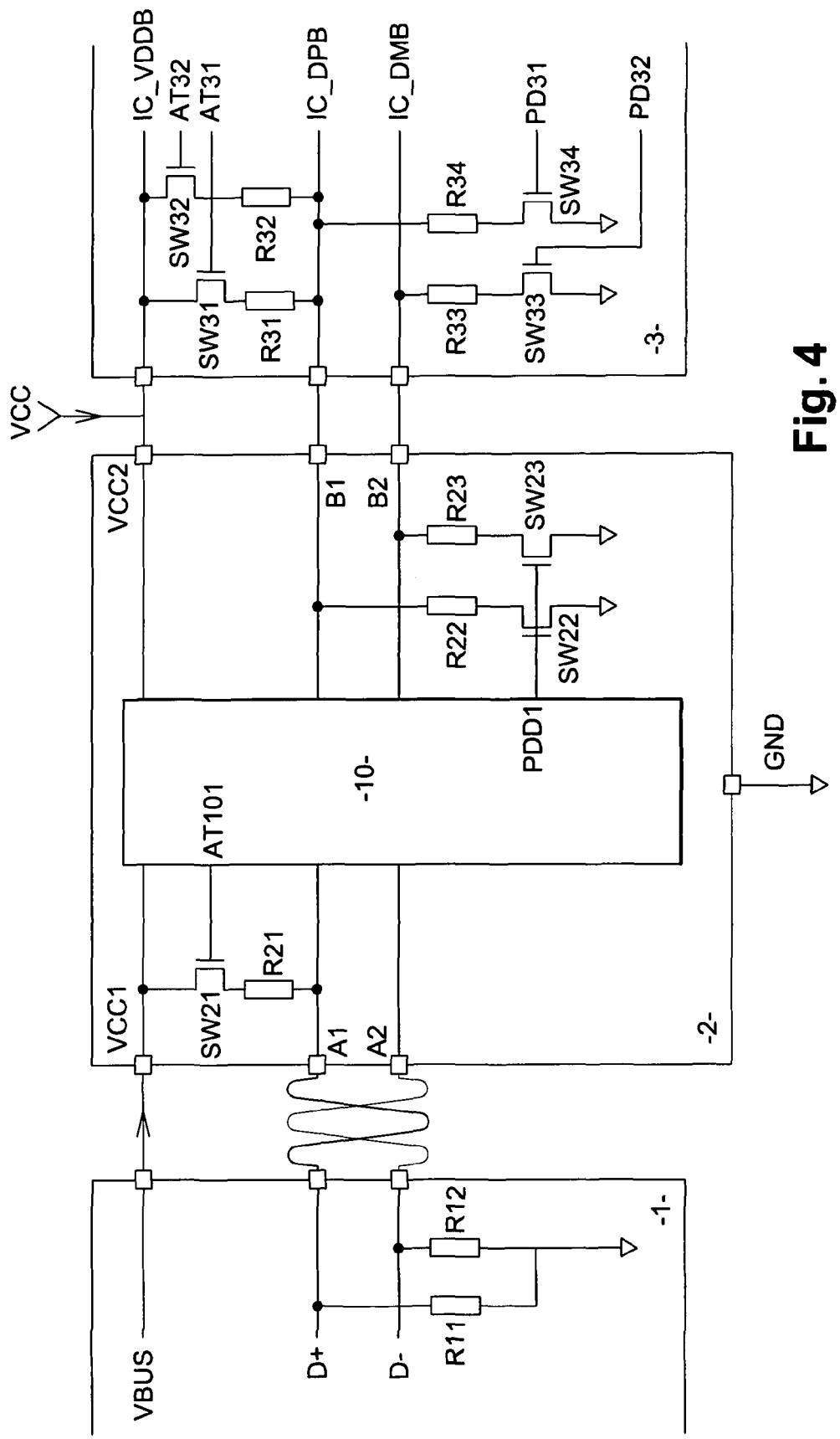
Figure 5:
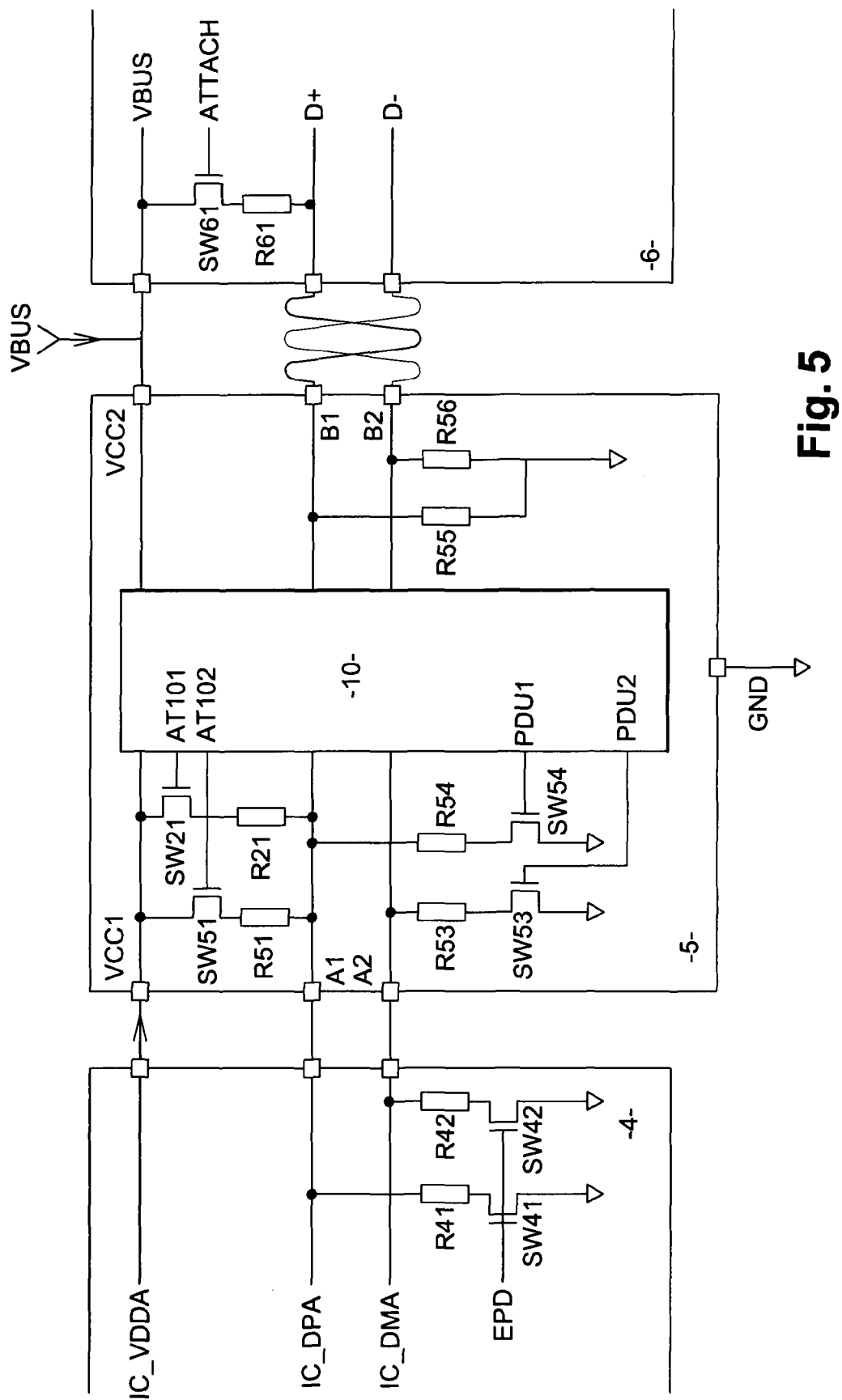
Figure 6:
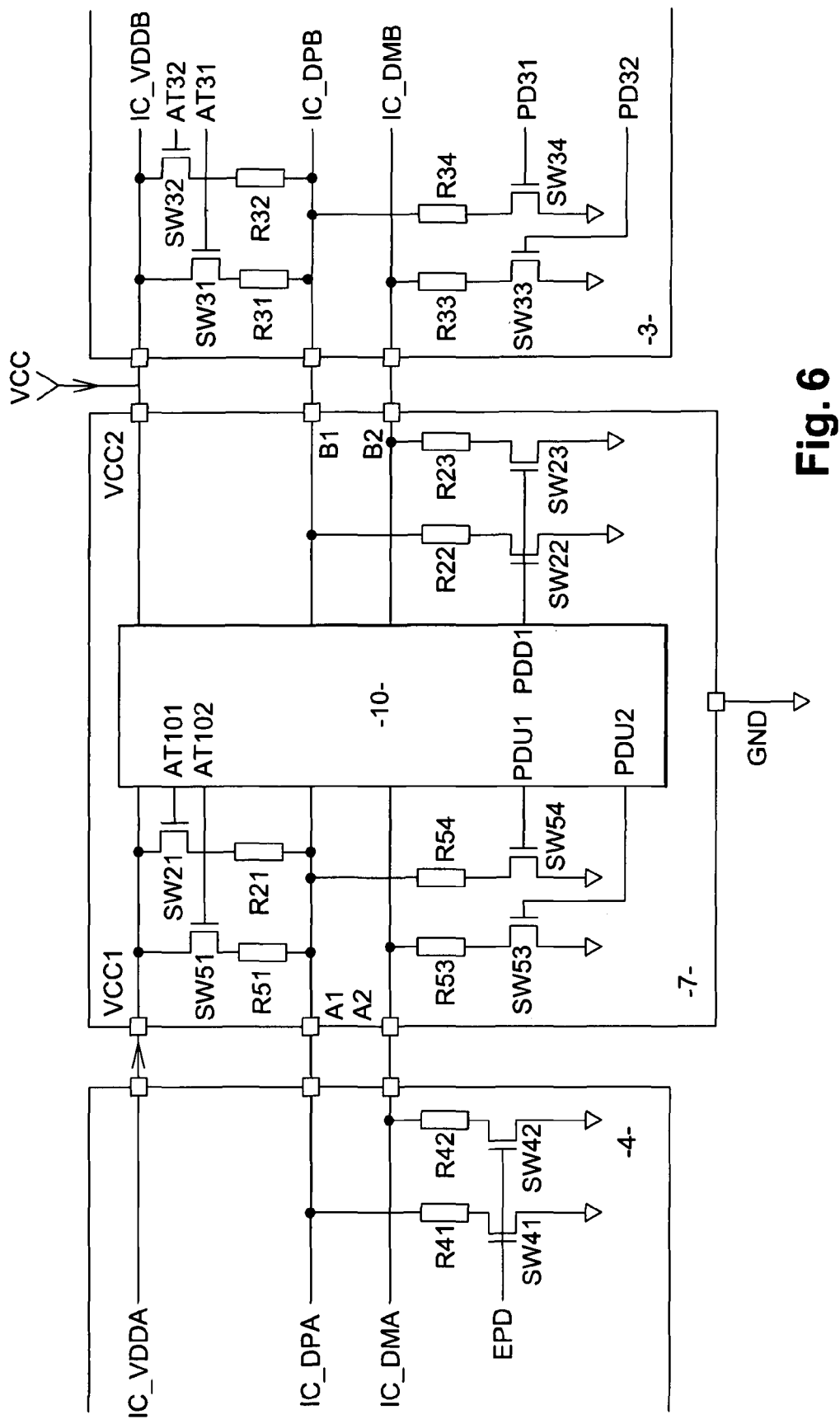
Figure 7:
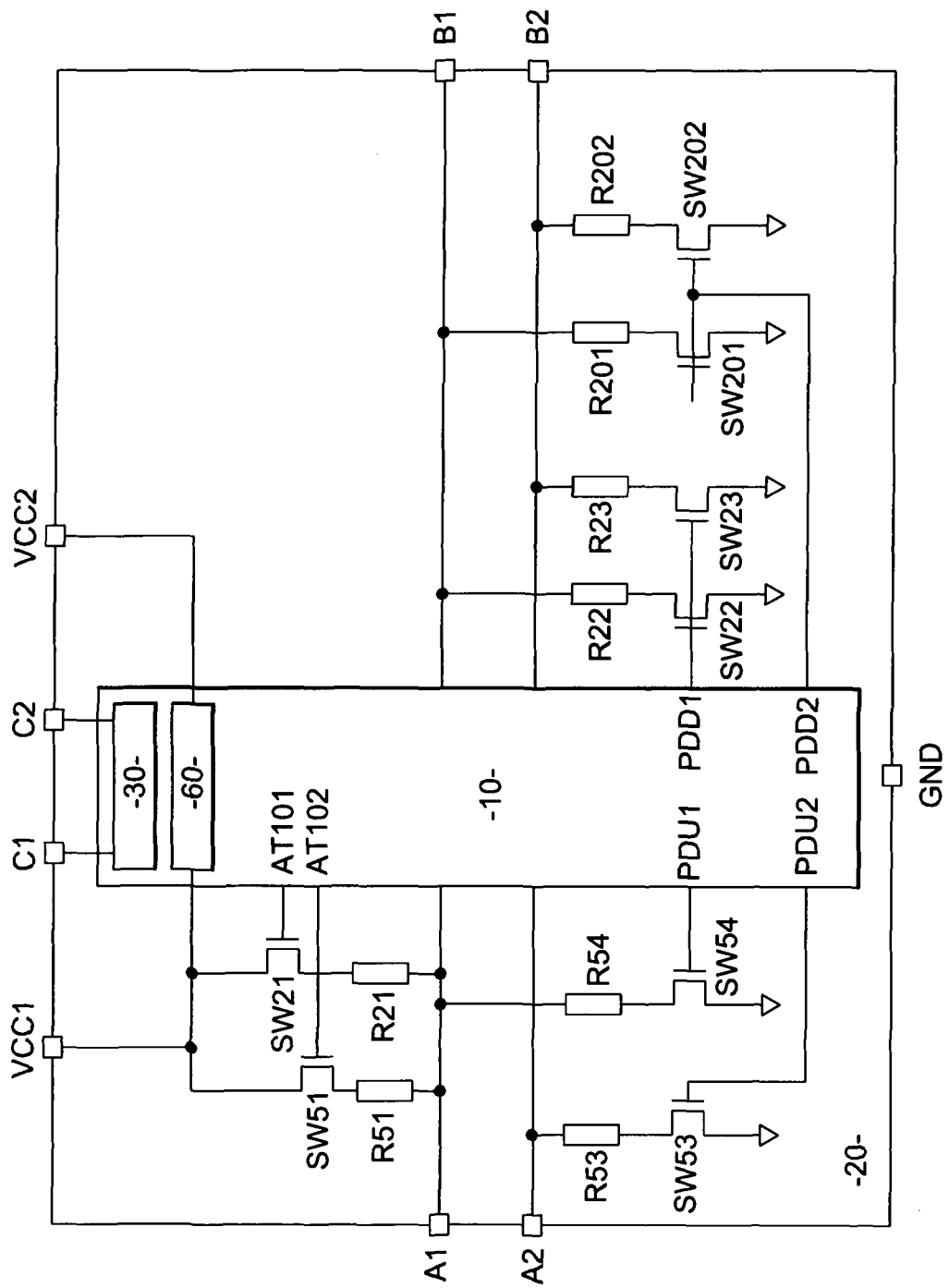
Figure 8:
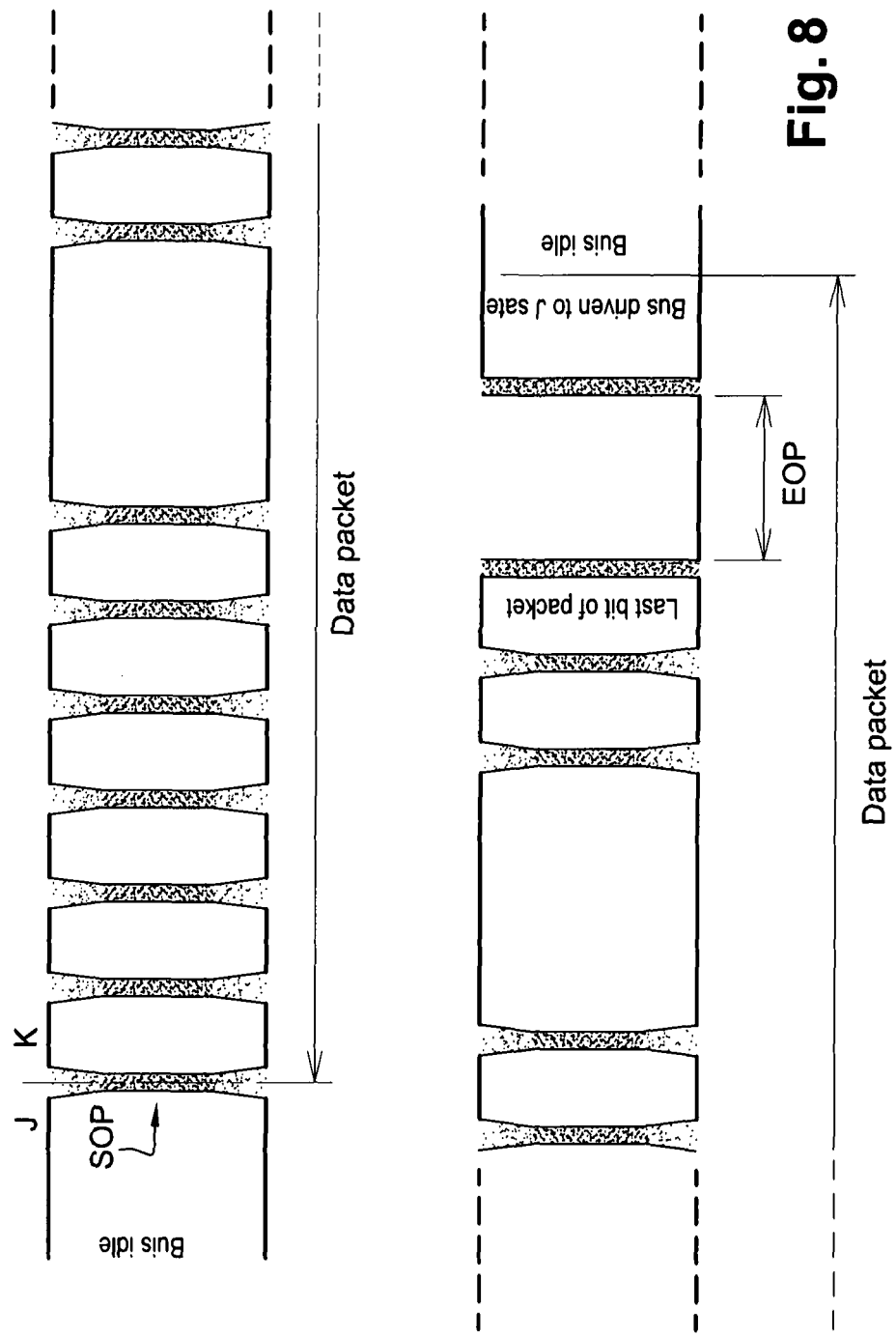
Figure 9:
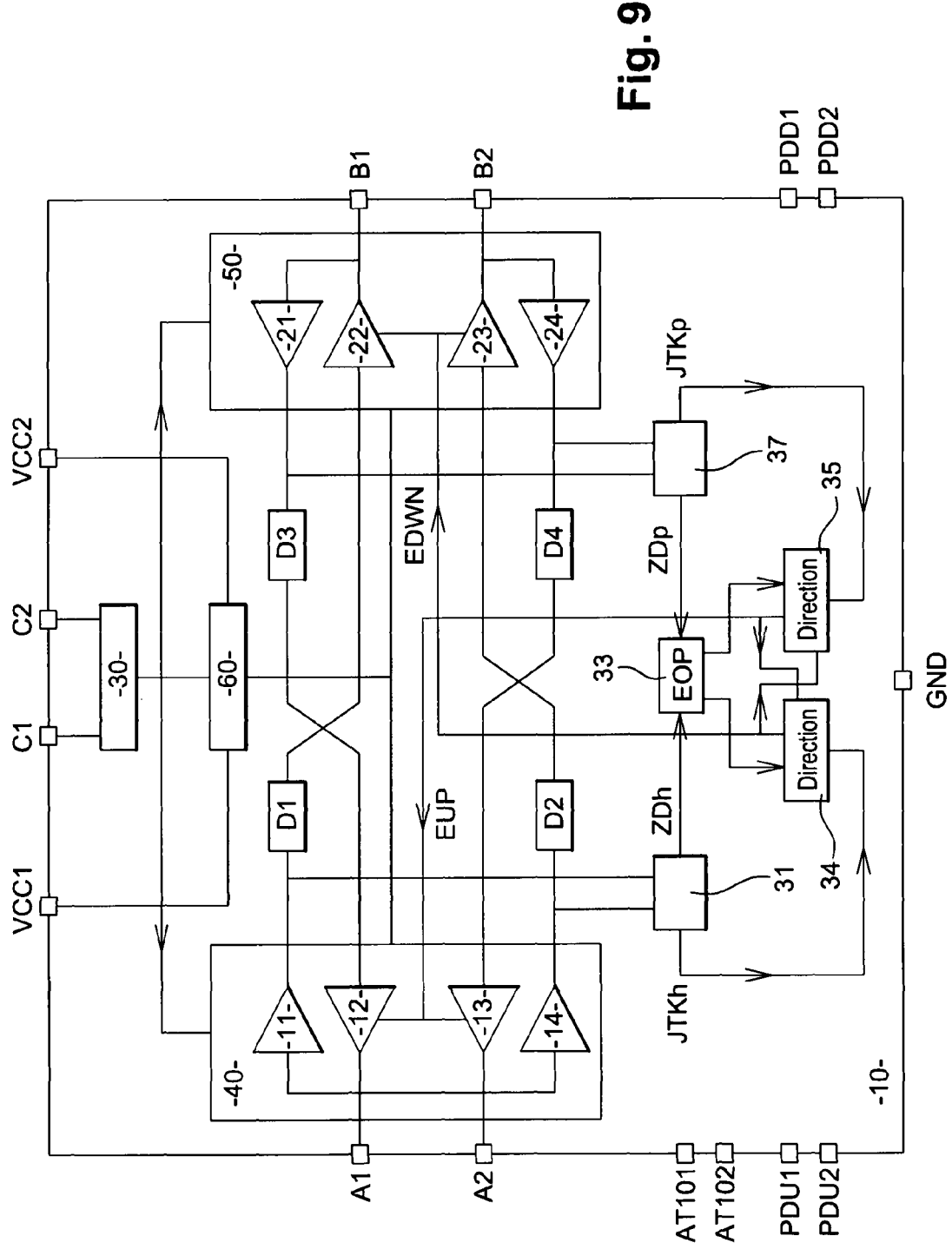

The invention and other features and advantages of the invention will be better understood after the following specification made in relation with the annexed drawings in which:

FIGS. 1 to 3 illustrate three different use cases of the invention,

FIGS. 4 to 6 details the pull-up and pull-down mechanism used in each use case of FIGS. 1 to 3, FIG. 7 shows a preferred embodiment for integration of FIGS. 4 to 6 in a single device, FIG. 8 shows timing of USB signals at the beginning and at the end of a packet, and FIG. 9 shows the core element of the circuit for data adaptation.

FIG. 1 illustrates a first use case of the present invention. A host 1 is a host according to USB 2.0 with section 7 electrical requirements. A peripheral 3 is a peripheral with IC_USB electrical requirements. A bridge 2 is mounted between the host 1 and the peripheral 3 for enabling electrical connectivity between a section 7 host port and any IC_USB peripheral port of any voltage class.

The ports of host 1, VBUS, GND, and data lines D+ and D−, are connected to first ports VCC1, GND and data lines A1 and A2 respectively, of the bridge 2, which is compatible with section 7 electrical characteristics. Second ports of bridge 2 are compatible with IC_USB electrical characteristics. These second ports, VCC2, GND and data lines B1 and B2 are connected to the ports IC_VDD, GND and data lines IC_DP and IC_DM respectively, of peripheral 3.

VBUS supplies power to VCC1 and its nominal value is 5 Volt. VCC supplies power to VCC2 and IC_VDD, its nominal value is within a range of 1 Volt to 3 Volt. The power supply VCC is independent from VBUS.

When at least one of the power supply voltage is not above a minimal value, the ports A1, A2, B1 and B2 of the bridge 2 are put in high impedance. Pull-down resistors (not shown on this FIG. 1) on first ports A1 and A2 are connected to GND as early as possible during power up sequence. Both power supply voltages, VCC1 and VCC2, shall be present and within certain limits to allow the bridge 2 to establish a communication path between the host 1 and the peripheral 3. When the peripheral 3 attaches to the bus, pulling-up port IC_DP when in FS, bridge 2 pulls up port A1 as if the port A1 was the D+ port of a peripheral according section 7. The host detects the attachment of a FS device on its port D+.

After attachment of the peripheral 3 to the bridge 2 and attachment of the bridge 2 to the host 1, the bridge 2 is put in an idle state. On detection of a Start Of Packet (SOP) from the host 1, the bridge 2 conveys packet to the peripheral 3. After an End Of Packet (EOP) signaling the end of the transmitted packet, the bridge 2 returns in the idle state. On detection of a SOP from the peripheral 3, the bridge 2 conveys packet to the host 1. After an EOP signaling the end of the transmitted packet, the bridge 2 returns in the idle state.

When the bridge is in the idle state, the USB segment between the host 1 and the bridge 2 and the USB segment between the bridge 2 and the peripheral 3 are both idle. The ports A1 and A2 are put in high impedance. The power supply current entering the port VCC2 is less than 1 µA and the power supply current entering the port VCC1 is less than 500 µA, enough to generate VTERM voltage (3.3 Volt in nominal value), to bias a pull-up resistor on port A1 and to power receivers the first port.

The ports B1 and B2 of the bridge 2 behave as an IC_USB host port with voltage class VCC. Dynamic power consumptions are only related to the capacitive loads on ports A1, A2, B1 and B2.

The man of the art can remark that the bridge 2 is not enumerated and is not assigned to an USB address by the host 1. The bridge 2 is a pass-through element, which is clearly different from an USB hub.

FIG. 2 illustrates a second use case of the present invention. A host 4 is a host according to IC_USB electrical requirements. A peripheral 6 is a peripheral according USB 2.0 with section 7 electrical requirements. A bridge 5 is mounted between the host 4 and the peripheral 6 for enabling electrical connectivity between a section 7 peripheral port and any IC_USB host port of any voltage class.

The IC_USB Host 7 ports have IC_USB electrical characteristics. These ports, IC_VDDA, GND and data lines IC_DPA and IC_DMA, are connected to first ports, VCC1, GND and data lines A1 and A2 respectively, of the bridge 5. Bridge 5 first ports have IC_USB electrical characteristics.

Second ports of bridge 5 have section 7 electrical characteristics. These second ports VCC2, GND and data lines B1 and B2, are connected to the peripheral ports VBUS, GND and data lines D+ and D− respectively, of section 7 peripheral 6.

IC_VDDA supplies power to VCC1 and its nominal value is within the 1 Volt to 3 Volt range. External VBUS supplies power to VCC2 and Peripheral's VBUS, its nominal value is 5.0 Volt. The powering up of IC_VDDA and VBUS may happen in any order.

When at least one of the power supply voltage is not above a minimal value both the ports A1, A2, 61 and B2 are put in high impedance. Both power supply voltages IC_VDDA and VBUS shall be present and within certain limits to allow the bridge 5 to establish a communication path between the host and the peripheral. Pull-down resistors on bridge 5's second port and first port are connected to GND as early as possible during the power up sequence.

When the section 7 peripheral 6 attach to the bus, pulling up port D+ when in FS, then the bridge 5 pulls up port A1 as if the port A1 was the IC_DPA port of a FS IC_USB peripheral. Then the host detects the attachment of a FS device on its downstream port.

After attachment of the peripheral 6 to the bridge 5 and attachment of the bridge 5 to the host 4, the bridge 5 is put in an idle state. On detection of a SOP from the host 4, the bridge 5 conveys packet to the peripheral 6. After an EOP signaling the end of the transmitted packet, the bridge 5 returns in the idle state. On detection of a SOP from the peripheral 6, the bridge 5 conveys packet to the host 4. After an EOP signaling the end of the transmitted packet, the bridge 5 returns in the idle state.

When the bus is in idle state, both the USB segment between the host 4 and the bridge 5 and the USB segment between the bridge 5 and the peripheral 6 are idle. The power supply current entering the port VCC1 is less than 1 µA. The power supply current entering the port VCC2 is less than 300 µA enough to generate the VTERM voltage (3.3 Volt nominal) used by bridge receivers and transmitters on its second data ports B1 and B2.

The ports B1 and B2 of bridge 5 behave as a section 7 host port. The ports A1 and A2 of bridge 5 behave as an IC_USB peripheral port. Dynamic power consumption on VCC1 is only related to the capacitive loads on A1, A2. Dynamic power consumption on VCC2 is related to the capacitive load on B1 and B2.

The man of the art may remark that the bridge 5 allows one IC_USB host 4 having any voltage class to communicate with a section 7 peripheral 6. In addition, the bridge 5 is not enumerated and is not assigned to an USB address by the USB Host 4.

FIG. 3 illustrates a third use case of the present invention. A host 4 is a host with IC_USB electrical requirements. A peripheral 3 is a peripheral with IC_USB electrical requirements but with a different voltage class than the voltage class of the host 4. A bridge 7 is mounted between the host 4 and the peripheral 6 for enabling electrical connectivity between a host and a peripheral having two different voltage classes.

The ports of Host 4 have IC_USB electrical characteristics. These ports IC_VDDA, GND and data lines IC_DPA and IC_DMA, are connected to first ports VCC1, GND and data lines A1 and A2 respectively, of bridge 7. The first ports of bridge 7 have IC_USB electrical characteristics of a same voltage class than Host 4.

Second ports of bridge 7 have IC_USB electrical characteristics. These ports VCC2, GND and data lines B1 and B2, are connected to the ports IC_VDDB GND and data lines IC_DPB and IC_DMB respectively, of peripheral 3. The second ports of bridge 7 have IC_USB electrical characteristics of a same voltage class than the peripheral 3.

IC_VDDA supplies power to VCC1 and its nominal value is within the 1.0 Volt to 3.0 Volt range. VCC supplies power to VCC2 and IC_VDDB, its nominal value is within the 1.0 Volt to 3.0 Volt range. Voltage on IC_VDDA is as of a first IC_USB voltage class and voltage on IC_VDDB may be as of a second IC_USB voltage class. As an example IC_VDDA may be at 1.8 Volt nominal while IC_VDDB may be at 3.0 Volt nominal. Without the bridge 7 the host 4 and the peripheral 3 could not communicate.

The powering up of IC_VDDA and VCC may happen in any order. When at least one of the power supply voltages is not above a minimal value both ports A1, A2, B1 and B2 port are put in high impedance. Pull-down resistors on bridge 7's data ports A1, A2, B1 and B2 are connected to GND as early as possible during the power up sequence. Both power supply voltages IC_VDDA and VCC shall be present and within certain limits to allow the bridge 7 to establish a communication path between the host 4 and the peripheral 3.

When the IC_USB peripheral attach to the bus, pulling up port IC_DPB when in FS, bridge 7 pulls up port A1 as if the port A1 was the IC_DPA port of a FS IC_USB peripheral. The host detects the attachment of a FS device on its port IC_DPA.

After attachment of the peripheral 3 to the bridge 7 and attachment of the bridge 7 to the host 4, the bridge 7 is put in an idle state. On detection of a SOP from the host 4, the bridge 7 conveys packet to the peripheral 3. After an EOP signaling the end of the transmitted packet, the bridge 7 returns in the idle state. On detection of a SOP from the peripheral 3, the bridge 7 conveys packet to the host 4. After an EOP signaling the end of the transmitted packet, the bridge 7 returns in the idle state.

When the bus is in idle state, both the USB segment between the host 4 and the bridge 7 and the USB segment between the bridge 7 and the peripheral 3 are idle. The power supply current entering the port VCC1 and the power supply current entering the port VCC2 are less than 1 µA.

The ports A1 and A2 of bridge 7 behave as IC_USB peripheral ports and the ports B1 and B2 of bridge 7 behave as IC8USB host ports. Dynamic power consumption is only related to the capacitive loads on A1, A2, B1 and B2.

The man of the art may remark that bridge 7 allows an IC_USB host 4 having a first voltage class to communicate with an IC_USB peripheral 3 having a second voltage class. In addition, bridge 7 is not enumerated and is not assigned to an USB address by the USB Host 4.

FIG. 4 details pull-up and pull-down mechanisms used in the use case of FIG. 1 corresponding to the host 1, the bridge 2 and the peripheral 3.

The bridge 2 includes a pull-up resistor R21 in series with a switching transistor SW21 on its first port A1, said pull-up resistor R21 being in conformity with section 7 of USB 2.0. Pull-down resistors R22 and R23 in series with switching transistor SW22 and SW23 between respectively each data port B1 and B2 and the ground port GND of the second ports of the bridge 2.

As specified in the IC_USB supplement, the resistor R31 is about 1.5 kOhm and the resistors R22, R23, R32, R33 and R34 are about 50 kOhm. As specified in the section 7, the resistors R11 and R12 are about 15 kOhm and the resistor R21 is about 1.5 kOhm.

Here below is described the functional sequence that is implemented for an attachment of the peripheral 3 to the host 1, with chronological steps 1-7:

Step 1. After the power up sequence:
   In the bridge 2, the switching transistor SW21 is open, the switching transistors SW22 and SW23 are closed.
   In the peripheral 3, the switching transistors SW33 and SW34 are closed, the switching transistors SW31 and SW32 are open.

Step 2. The peripheral 3 (FS) attaches to the IC_USB. It pulls up IC_DPB by closing the switching transistor SW31. Then, the bridge 2 detects the pulling-up of data port B1 and conveys that information to AT101. AT101 controls the switching transistor SW21 that pulls up data port A1.

Step 3. The host 1 detects a new device on its data port D+ and the host controller sends a reset signaling to the peripheral 3 through the bridge 2. The bridge 2 detects the reset signaling and opens switching transistors SW22 and SW23. The reset signaling is conveyed to the peripheral 3 in charge to polarize the IC_USB segment with no bias current by opening the switching transistors SW31 and SW34 and, closing the switching transistors SW32 and SW33.

Step 4. After the reset signaling both buses are in idle.

Step 5. The peripheral 3 may decide to disconnect from the IC_USB by closing the switching transistor SW34 and opening the switching transistor SW32. This soft detach is conveyed to the bridge 2 via its data port B1. AT101 blocks the switching transistor SW21 and the host 1 sees that the section 7 peripheral, which includes bridge 2 and the peripheral 3, has been disconnected from the USB.

Step 6. The peripheral 3 may decide to connect to the IC_USB by closing the switching transistor SW32 and opening the switching transistor SW34. This soft attach is conveyed to the bridge 2 via its data port B1. AT101 closes the switching transistor SW21 and the host 1 sees that a section 7 peripheral, which includes bridge 2 and the peripheral 3, is connected to the USB.

Step 7. GOTO step 3.

FIG. 5 details pull-up and pull-down mechanisms used in the use case of FIG. 2 corresponding to the host 4, the bridge 5 and the peripheral 6.

The bridge 5 includes a pull-up resistors R21 in series with a switching transistor SW21 and a pull-up resistor R51 in series with switching transistor SW51, these two branches being connected between VCC1 port and data port A1. The bridge 5 comprises a pull-down resistor R53 in series with a switching transistor SW53 between ground port GND and the data A2. A pull-down resistor R54 in series with a switching transistor SW54 is placed between data port A1 and ground port GND. On the other side of the bridge, two pull-down resistors R55 and R56 are mounted between each data port B1 and B2 and the ground port GND.

As specified in the IC_USB supplement, the resistor R21 is about 1.5 kOhm and the resistors R41, R42, R51, R53 and R54 are about 50 kOhm. As specified in the section 7, the resistor R61 is about 1.5 kOhm and the resistors R55 and R56 are about 15 kOhm.

Here below is described the functional sequence that is implemented for attachment of the peripheral 6 to the host 4, with chronological steps 1-7:

Step 1. After the power up sequence:
  In the host 4, the switching transistors SW41 and SW42 are closed.
  In the bridge 5, the switching transistors SW21 and SW51 are open and the switching transistors SW53 and SW54 are closed.
  In the peripheral 6, the switching transistor SW61 is open.
Step 2. The peripheral 6 (FS) attaches to the USB. It pulls up D+ by closing the switching transistor SW61. The bridge 5 conveys that information to AT101. AT101 closes switching transistor SW21 that pulls up data port A1.
Step 3. The host 1 detects a new device on its data port IC_DPA and the host controller sends a reset signaling to the peripheral 6 through the bridge 5. The reset signaling is detected in the host, switching transistors SW41 and SW42 open. The bridge 5 detects the reset signaling and so it closes the switching transistor SW51 and it opens switching transistors SW21 and SW54. The reset signaling is conveyed to the peripheral 6.
Step 4. After the reset signaling both buses are in idle state.
Step 5. The peripheral 6 may decide to disconnect from the USB by opening the switching transistor SW61. This soft detach is conveyed to the bridge 5 data port B1. AT102 opens the switching transistor SW51 and PDU1 closes the switching transistor SW54. The host 4 sees that the IC_USB peripheral, which includes bridge 5 and the peripheral 6, has been disconnected from the IC_USB.
Step 6. The peripheral 6 may decide to connect to the USB by closing the switching transistor SW61. This soft attach is conveyed to the bridge 5 data port B1. AT101 closes the switching transistor SW21 and the host 1 sees that an IC_USB peripheral, which includes bridge 5 and the peripheral 6, is connected to the IC_USB.
Step 7. GOTO 3.

FIG. 6 details pull-up and pull-down mechanisms used in the use case of FIG. 3 corresponding to the host 4, the bridge 7 and the peripheral 3.

The bridge 7 includes a pull-up resistor R21 in series with a witching transistor SW21 and a pull-up resistor R51 in series with a switching transistor SW51, these two branches being placed between the data port A1 and the port VCC1. A pull-down resistor R53 is mounted in series with the switching transistor SW53 between data port A2 and the ground port GND. A pull-down resistor R54 is mounted in series with switching transistor SW54 between data port A1 and the ground port GND. Two pull-down resistors R22 and R23 in series with respectively two switching transistors SW22 and SW23 between the ground port GND and respectively each data port B1 and B2.

As specified in the IC_USB supplement, the resistors R21, R31 are about 1.5 kOhm, and the resistors R22, R23, R32, R33, R34, R41, R42, R51, R53 and R54 are about 50 kOhm.

Here below is described the functional sequence that implements an attachment for peripheral 3 with chronological steps 1-7:

Step 1. After the power up sequence:
  In the host 4, the switching transistors SW41 and SW42 are closed.
  In the bridge 7, the switching transistors SW21 and SW51 are opened and the switching transistors SW22, SW23, SW53 and SW54 are closed.
  In the peripheral 3, the switching transistors SW33 and SW34 are closed and the switching transistors SW31 and SW32 are opened.
Step 2. The peripheral 3 (FS) attaches to the IC_USB. It pulls up IC_DPB by closing the switching transistor SW31. Then the bridge 7 detects the pulling-up of signal on data port B1 and it conveys this information to AT101. AT101 closes the switching transistor SW31 that pulls up data port A1.
Step 3. The host 4 detects a new device on its data port IC_DPA and the host controller sends a reset signaling to the peripheral 3 through the bridge 7. The reset signaling is detected in the host 4, and the switching transistors SW41 and SW42 open. The bridge 7 detects this reset signaling, so it closes the switching transistor SW51 and it opens the switching transistors SW21 and SW54. The reset signaling is conveyed to the peripheral 3 and the peripheral 3 opens the switching transistors SW31 and SW34 while it closes the switching transistor SW32.
Step 4. After the reset signaling both buses are in idle.
Step 5. The peripheral 3 may decide to disconnect from the IC_USB by opening the switching transistor SW32 and closing the switching transistor SW34. This soft detach is conveyed to the bridge 7 data port B1. AT102 opens the switching transistor SW51 and PDU1 closes the switching transistor SW54. The host 4 sees that the IC_USB peripheral, which includes bridge 7 and the peripheral 3, has been disconnected from the IC_USB.
Step 6. The peripheral 3 may decide to connect to the USB by closing the switching transistor SW31. This soft attach is conveyed to the bridge 7 data port B1. AT101 closes the switching transistor SW21 and the host 4 sees that an IC_USB peripheral with a first voltage class, which includes bridge 7 and the peripheral 3 with a second voltage class, is connected to the IC_USB.
7. GOTO 3.

FIG. 7 is a preferred embodiment of the invention that includes all the use cases disclosed before. The circuit 20 regroups pull-up resistors and pull-down resistors required in the bridge 2 of the FIG. 4, in the bridge 5 of FIG. 5, and in the bridge 7 of FIG. 6. The appropriate configuration of pull-up and pull-down resistors is selected by selection inputs C1 and C2 supplied to the selection circuit 30, included in core circuit 10.

Resistors R201 and R202 in series with switching transistors SW201 and SW202 correspond to the resistors R55 and R56 previously shown in FIG. 5. When the selection circuit 30 selects section 7 electrical characteristics for the second port PDD1 is set to low and PDD2 is set to high. Resistors R22 and R23 are not connected to GND while resistors R201 and R202 are connected to GND through the switching transistors SW201 and SW202 respectively. The commutations of other switching transistors are detailed in relation with FIGS. 4 to 6.

Supply circuit 60 surveys the power supply voltages. The core circuit data ports A1, A2, B1 and B2 are in high impedance until both power supply voltages are within targeted limits. As indicated before ports A1 and A2 and the ports B1 and B2 may be an IC_USB or a section 7 ports independently from one to each other.

As an example the following Table 1 describes selection circuit 30 coding:

TABLE 1

| sub circuit coding | | | |
|---|---|---|---|
| C2 | C1 | first ports | second ports |
| 0 | 0 | IC_USB (VCC1 > VCC2) | IC_USB (VCC1 > VCC2) |
| 0 | 1 | Section 7 | IC_USB |

TABLE 1-continued

| sub circuit coding | | | |
|---|---|---|---|
| C2 | C1 | first ports | second ports |
| 1 | 0 | IC_USB | Section 7 |
| 1 | 1 | IC_USB<br>(VCC2 > VCC1) | IC_USB<br>(VCC2 > VCC1) |

A variant may consist in the suppression of the selection input C1 and C2. A detection of the USB compliance can be performed by the supply circuit 60. Such detection depends of the input voltage VCC1 and VCC2. If VCC1 is greater than a voltage threshold, for example 4.01 Volt, then the first ports are compliant with Section 7. If VCC1 is lower than the voltage threshold then the first ports are compliant with IC_USB. If VCC2 is greater than the voltage threshold then the second ports are compliant with Section 7. If VCC2 is lower than the voltage threshold then the second ports are compliant with IC_USB.

FIG. 8 illustrates the data patterns for SOP and EOP present on D+ and D− data lines according section 7 or respectively on IC_DP and IC_DM data lines according IC_USB supplement. The man of the art may refer to USB standard for more details. Main characteristics are shown on these patterns:

The bus is in idle state when the differential data lines are in J state. In FS, J state corresponds to data line D+ or IC_DP are put in high logical level and D− or IC_DM are put in low logical level. This J state is maintained by pull-up and pull-down resistors that bias the data buses.

The Start Of Packet SOP materializes the beginning of a transmission of a packet onto the bus. The SOP may be sent either by the host or by the peripheral and it corresponds to a first transition from state J to state K, state K being the complementary logical level to state J.

The End Of Packet EOP materializes the end of the transmission of a packet onto the bus. The EOP is sent after the last bit of a transmitted packet. The EOP consist in driving the two data lines D+ and D− or the two data lines IC_DP and IC_DM at the same low logical level during two bit durations.

After the EOP the transmitter forces the bus in the J state during one bit duration.

After forcing the J state, the transmitter goes into tri state and the bus is in idle state again, waiting the next SOP.

The J to K transition informs about a Start Of Packet. The invention opens unidirectional communication path from the host to the peripheral or the reverse after detection of a SOP coming from the host or from the peripheral. This unidirectional communication path ends when an EOP is detected.

In the present invention: the core circuit 10 detects a J to K transition on the host side and on the peripheral side. Then the core circuit 10 establishes a communication path between the host and the peripheral or the reverse. During the transmission of the packet, the core circuit detects EOP. After detection of an EOP, it forces a J state on the destination port during one bit duration before closing the communication path and returning in idle state.

FIG. 9 details the core circuit 10 of the bridge 20. A first differential transceiver stage 40 drives and reads the first data ports A1 and A2. A second differential transceiver stage 50 drives and reads the second data ports B1 and B2.

The first stage 40 comprises output buffers 12 and 13 that drive data ports A1 and A2 respectively, and input buffers 11 and 14 that receive signals from data ports A1 and A2 respectively. The second stage 50 comprises output buffers 22 and 23 that drive data ports B1 and B2 respectively, and input buffers 21 and 24 that receive signals from data ports B1 and B2 respectively. The input buffers 11, 14, 21 and 24 are, as example, simple pass-gates that transmit basically the signal at their inputs to their outputs. The output buffers 12, 13, 22 and 23 are tri-state buffers that can be put in high impedance state or in pass-gate states (high or low).

Selection circuit 30 selects one bridge configuration, it is used for determining the value of command signals AT101, AT102, PDU1, PDU2, PDD1 and PDD2 that drive the switching transistors, as explained in relation with FIGS. 3 to 7. A link to the first and second transceiver stages 40 and 50 can be used for minimizing power consumption, as explained later.

The supply circuit 60 monitors both VCC1 and VCC2. When both power supply voltages are outside their nominal range, output buffers 12, 13, 22 and 23 are put in high impedance. When both power voltages are inside their nominal range, ports A and B are still maintained in high impedance and the corresponding pull-down resistors are connected through their switching transistors.

In a preferential manner, the core circuit is powered with the lowest voltage for reducing power consumption. In this preferential choice, the voltage conversion is made in one of the transceiver stage 40 or 50. The first transceiver stage 40 is supply with VCC1 and the second transceiver stage 50 is supplied with VCC2. If VCC1 is higher than VCC2, than the first transceiver stage 40 is also powered with VCC2 for making the voltage transformation with input and output buffers 11 to 14. If VCC1 is lower than VCC2, than the second transceiver stage 50 is also powered with VCC1 for making the voltage transformation with input and output buffers 21 to 24. Such input/output buffers with voltage adaptation are well known in the art and do not necessitate more explanations.

A first detection circuit 31 is connected at the output of input buffers 11 and 14 of the first transceiver stage 40 and a second detection circuit 37 is connected at the output of input buffers 21 and 24 of the second transceiver stage 50. Each of the first detection circuits 31 and 37 detects some patterns of the data signals. Each detection circuit 31 or 37 provides a first signal ZDh, or respectively ZDp, active when the both output of the input buffer are simultaneously at low level. Each detection circuit 31 or 37 provides a second signal JTKh, or respectively JTKp, active when a J to K transition has been detected at the output of the input circuit 11 and 14, or respectively 21 and 24.

A logical circuit 33 receives the both first signals ZDh and ZDp from first and second detection circuits 31 and 37 and provides two signals corresponding to the detection of the EOP from one side or the other side.

First and second direction circuits 34 and 35 each receives a JTK signal from first and second detection circuits 31 and 37 respectively and one of the EOP signal from logical circuit 33. The direction circuits 34 and 35 may be simple RS flip-flop that has their output that toggles in one value if at least one JTKi signal arrives and that toggles in the other value as soon as an EOP signal arrives. Each direction circuit receives a signal from the other circuit to be locked or unlocked. The output of direction circuit 34 and 35 are linked to respectively second and first transceiver stage 50 and 40 for enabling the output buffers 22, 23, 12 and 13 to transmit data from their inputs to their outputs or to put them into high impedance output state.

After a power-on-reset signaling sequence and an attachment sequence, the buses are in idle state. An example of functioning can start with the reception of a J to K transition on data ports A1 and A2 corresponding to a SOP coming from the host. The detection circuit 31 actives the JTKh signal. The first direction circuit 34 toggles in a state that set a signal EDWN. The setting of signal EDWN enables output buffers 22 and 23 of the second transceiver stage 50 to be pass-gate. The second direction circuit 35 is now locked and cannot toggle.

Data are transmitted from the data ports A1 and A2 to data ports B1 and B2 through input buffers 11 and 14 and output buffers 22 and 23. For preventing timing distortion at the output, the output of inputs buffers 11 and 14 are respectively linked to the input of output buffers 22 and 23 through delay circuits D1 and D2 respectively. The delay circuits D1 and D2 are identical analog delay circuits that introduce a delay longer than the signal takes to propagate through the input buffers 11 or 14, the detection circuit 31, the logical circuit 33, the direction circuit 34 and the output buffers 22 and 23. At the end of the transmitted packet, an EOP arrives then the ZDh signal is activated first by the first detection circuit 31 and the ZDp signal is activated after by the second detection circuit 37. At this moment, the logical circuit 33 starts a first temporization for ensuring the rejection of spurious zero signals. After the end of the first temporization, the logical circuit 33 detects that the data ports carry an EOP. When the two signals ZDh and ZDp return both inactive, said logical circuit 33 triggers a second temporization. At the end of the second temporization, the logical circuit 33 sends a pulse to the first direction circuit 34. When the pulse is received by the first direction circuit 34, said circuit put outputs of output buffers 22 and 23 in high impedance and unlocks the second direction circuit 35. Then the bus is in idle state.

The man of the art may remark that the first temporization is an additional security because the detection made on the two signals ZDh and ZDp is itself a filter that rejects major part of spurious detection. The man of the art can also note that the second temporization is also an additional security that prevents any driving problem at the output because this temporization start after the data ports B1 and B2 are driven to J state. The man of the art will understand that these first and second temporization are purely optional.

Then a reception of a J to K transition on data ports B1 and B2 corresponding to an SOP may arrive. The detection circuit 37 actives the JTKp signal. The Second direction circuit 35 toggles in a state that sets a signal EUP. The EUP signal enables outputs buffers 12 and 13 of the first transceiver stage 40 to be pass-gate. The first direction circuit 34 is now locked and cannot toggle.

Data are transmitted from the data ports B1 and B2 to data ports A1 and A2 through input buffers 21 and 24 and output buffers 12 and 13. For preventing timing distortion at the output, the output of inputs buffers 21 and 24 are respectively linked to the input of output buffers 12 and 13 through delay circuits D3 and D4 respectively. The delay circuits D3 and D4 are identical analog delay circuits that introduce a delay for masking propagation time through the input buffers 21 or 24, the detection circuit 37, the logical circuit 33, the direction circuit 35 and the output buffers 12 and 13. At the end of the transmitted packet, an EOP arrives then the signal ZDp is activated first by the second detection circuit 37 and the signal ZDh is activated after by the first detection circuit 31. At this moment, the logical circuit 33 starts the first temporization. After the end of the first temporization, the logical circuit 33 waits the return to inactive state of signals ZDp and ZDh before starting the second temporization. At the end of the second temporization, the logical circuit 33 sends a pulse to the second direction circuit 35. When the pulse is received by the second direction circuit 35, said circuit 35 puts outputs of output buffers 12 and 13 in high impedance and unlocks the first direction circuit 34. Then the bus is in idle state.

Of course, the delay circuits D1 to D4 are designed identical and correspond to the longer time of transition on the considered paths.

While the invention has been particularly shown and described with reference to the preferred embodiments thereof, it will be understood by those skilled in the art that various changes in form and details may be made without departing from the invention.

The invention claimed is:

1. A bridge circuit between a first data port and a second data port, said bridge circuit comprising:
    a first transceiver stage supplied within a first voltage range, said first transceiver stage comprising at least one input buffer having an input linked to the first data port and at least one tri-state output buffer having an output linked to the first data port,
    a second transceiver stage supplied within a second voltage range, said second transceiver stage comprising at least one input buffer having an input linked to the second data port and at least one tri-state output buffer having an output linked to the second data port,
    a first detection circuit linked to first transceiver stage for detecting the arrival of a packet by the first data port,
    a second detection circuit linked to second transceiver stage for detecting the arrival of a packet by the second data port,
    a selection circuitry for enabling the output of the tri-state output buffer of the first or of the second transceiver stage depending of the detection made by the first and second detection circuits,
    a set of pull-up resistors connected to the first data port, said set of pull-up resistors being connected to the first voltage range as a function of the value of the first voltage range,
    a first set of pull-down resistors connected to the first data port, said first set of pull-down resistors being connected to a ground as a function of the value of the first voltage range,
    a second set of pull-down resistors connected to the second data port, said second set of pull-down resistors being connected to the ground as a function of the value of the second voltage range.

2. A bridge circuit of claim 1, wherein the first detection circuit detects a signal transition on the at least one input buffer of the first transceiver stage and wherein said transition enables the output of the tri-state output buffer of the second transceiver stage and wherein the second detection circuit detects a signal transition on the at least one input buffer of the second transceiver stage and wherein said transition enables the output of the tri-state output buffer of the first transceiver stage.

3. A bridge circuit of claim 1 wherein said circuit comprises at least a first delay circuit for linking the output of the at least one input buffer of the first transceiver stage to the input of the tri-state output buffer of the second transceiver stage and at least a second delay circuit for linking the output of the at least one input buffer of the second transceiver stage to the input of the tri-state output buffer of the first transceiver stage.

4. A bridge circuit of claim 1, wherein said circuit further comprises at least a third detection circuit for detecting the end of the packet arriving by the first data port or the end of the packet arriving by the second data port.

5. A bridge circuit of claim 1, wherein said first and second data ports are differential ports that support the following communication protocols: USB 2.0 section 7 and Inter-Chip USB supplement.

* * * * *